April 4, 1961  J. T. BEHER  2,978,691
LIQUID LEVEL GAGES
Filed Aug. 3, 1959
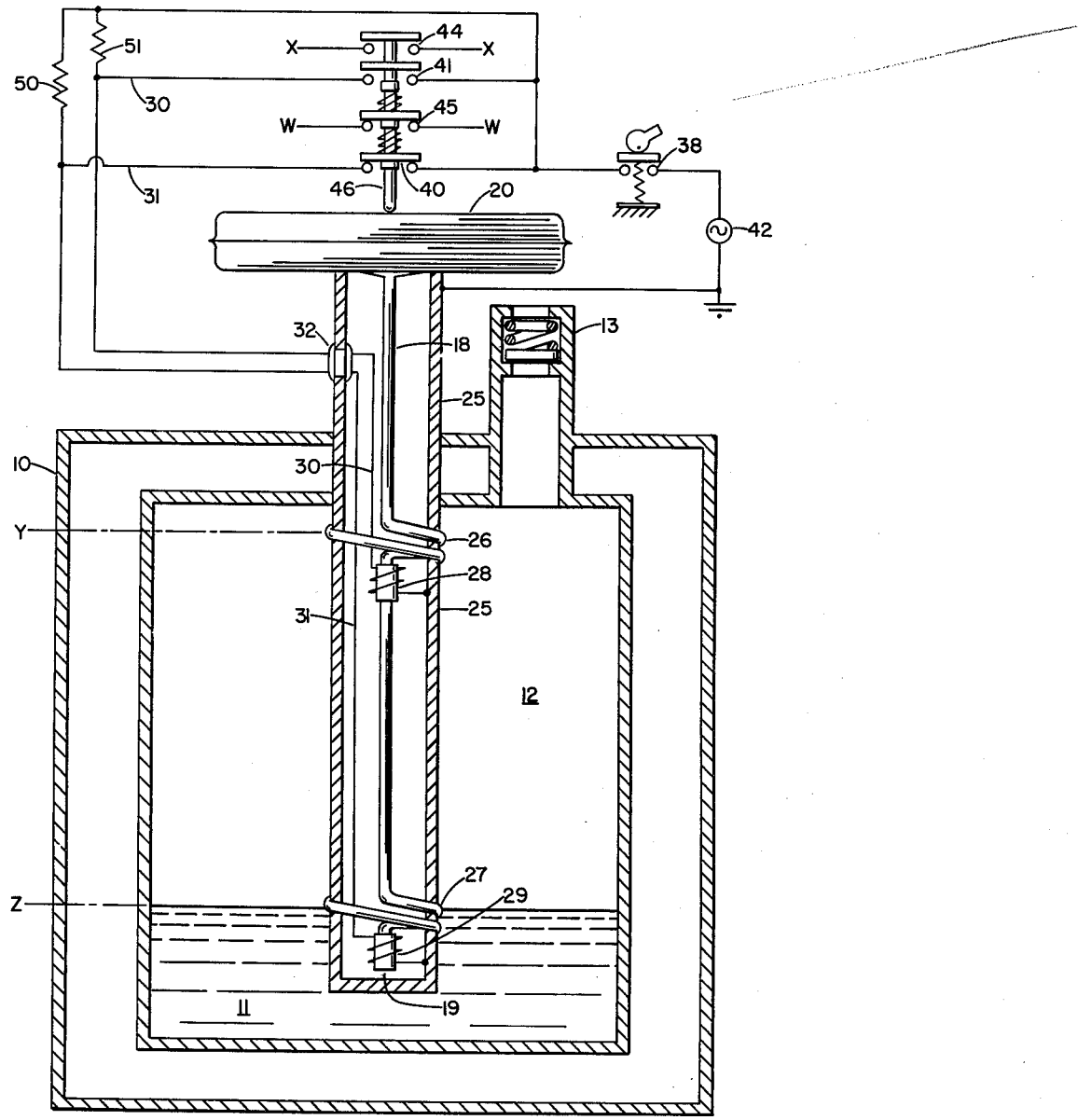
INVENTOR.
JOHN T. BEHER
BY Grover A. Frater
ATTORNEY

# United States Patent Office 2,978,691
Patented Apr. 4, 1961

2,978,691
LIQUID LEVEL GAGES

John T. Beher, Aurora, Ill., assignor to The Bendix Corporation, a corporation of Delaware Filed Aug. 3, 1959, Ser. No. 831,129
4 Claims. (Cl. 340—244)

This invention relates to improvements in liquid level gages.

An object of the invention is to provide an improved gage for indicating presence of liquid at a predetermined level.

Another object is to provide an improved level gage which utilizes the fact that liquids have greater heat conductivity than gases.

While the invention is useful in other applications, it is especially advantageous in gaging extremely cold liquids such, for example, as liquid oxygen, nitrogen, and air, and another object is to fill the need for an inexpensive, rugged, and reliable apparatus for this application.

Other objects and advantages will hereinafter be apparent.

One embodiment of the invention is illustrated schematically in the accompanying drawing, it being understood that various modifications may be made in the one illustrated, and that other embodiments of the invention are possible without departing from the spirit of the invention and the scope of the appended claims.

Referring to the drawing, the numeral 10 designates a vacuum insulated dewar for the storage of frigid liquids such as liquid air, nitrogen, or, as shown, a body of liquid oxygen 11; the space 12 above being filled with its vapors. A pressure sensitive relief valve 13 maintains the inner dewar pressure relatively constant.

The means for sensing the presence of the liquid at predetermined levels comprises: a closed sensing container having portions subjected to the temperature at said predetermined levels, means for sensing the pressure in said container, and a sensing fluid which fills the container and is pressurized to liquefy at the temperature of the liquid body 11 and evaporate at the temperature in the space 12. This fluid advantageously is the same substance as the substance whose level is being gaged but, of course, other fluids can be used if their pressure is adjusted whereby they are liquefied and evaporated at the prescribed temperatures.

The sensing container advantageously comprises a small bore tube 18 sealed closed at its lower end 19 and opening at its upper end into the interior of a sealed, expansible diaphragm capsule 20. The capsule 20 is disposed outside of the dewar and the small bore tube 18 is thermally insulated throughout its length except at the levels at which the presence of the liquid is to be gaged. Advantageously this is accomplished by enclosing the tube 18 in a larger diameter, evacuated tube such for example as the tube 25.

It being required to detect the presence of the liquid 11 at levels Y and Z, the small bore tube 18 extends downwardly in insulating tube 25 to the level Y where it emerges from tube 25. After completing one turn 26 about tube 25, the small bore tube 18 returns into tube 25, and thence downwardly to level Z where it again emerges. After completing one turn 27 about tube 25, the tube 18 is returned to the interior of tube 25.

Two heater coils, 28 and 29, are wound about tube 18 inside of tube 25. One end of both coils is connected to the electrically conductive tube 25 which is at "ground" potential. Coil 28 is disposed about tube 18 adjacent level Y and its other end is connected to an electrical conductor 30. Coil 29 is disposed about tube 18 adjacent level Z and its other end is connected to electrical conductor 31. Conductors 30 and 31 emerge from tube 25 through an insulator 32.

Conductors 30 and 31 are connected, through switches 40 and 41, respectively, through a manually operated switch 38 to one side of an electrical power source 42 whose other side is connected to electrical ground.

These switches and switches 44 and 45, which are connected in series with circuits X—X and W—W, respectively, are actuated by expansion and contraction of the capsule 20. Each switch comprises a contactor carried by an actuator 46 which moves up, in the drawing, when capsule 20 expands and down when the capsule contracts. The contactors of switches 40 and 45 have a lost-motion connection to actuator 46 whereby in a contracted condition of capsule 20 all switches are closed, in an expanded condition all switches are open, and in an intermediate capsule condition switches 41 and 44 are open whereas switches 40 and 45 are closed.

In the embodiment selected for illustration, resistors 50 and 51 are connected in shunt circuit with switches 40 and 41 respectively whereby, when manual switch 38 is closed, a limited electric current flows through heaters 28 and 29 and the heaters warm the sensing tube 18 and its contents slightly. When switch 40 is closed to short circuit resistor 50, the degree of energization and heating of heater 29 are increased. Similarly, the enerization and heating of heater 28 are increased when switch 41 closes to short circuit resistor 51.

In the following description of operation of the system, it is assumed that manual switch 38 is closed and that the dewar 10 is initially filled with liquid oxygen at the level Z, as shown. Coil 26 is surrounded by oxygen vapors whose temperature is low but whose heat conductivity is too low to accomplish cooling of coil 26 sufficiently to liquefy the sensing fluid it contains. However, coil 27 is immersed in liquid oxygen which conducts heat away from coil 27 more rapidly than it is added by conduction from capsule 20 and heaters 28 and 29. Accordingly, the fluid in coil 27 is liquefied and the pressure within tube 18 and capsule 20 is reduced whereby capsule 20 collapses to the condition shown, lowering actuator 46 sufficiently to close switch 40. Closure of switch 40 short circuits resistor 50 to increase the energization and heating of heater 29 but the increase is not sufficient to overcome the loss by conduction through the liquid and the fluid contents of coil 27 remains liquid.

It is necessary that the pressure and volume of the sensing fluid in tube 18 be great enough so that as portions of it are liquefied, the pressure of the still gaseous portion remains above the vapor pressure of the fluid. The liquefied portions will approach the temperature of the liquid whose level is to be gaged so that this vapor pressure can be determined. In the example selected for illustration, the temperature of the liquid oxygen body 11 will be determined by the pressure in the dewar 10. Thus, if the sensing fluid is oxygen, it need only be introduced into tube 18 at a pressure somewhat higher than the pressure which relief valve 13 maintains in the dewar 10. The amount by which the pressure in tube 18 exceeds the pressure in the dewar depends upon the volume capacity of tube 18 and capsule 20.

If another sensing fluid is employed, the pressure at which it must be introduced into tube 18 will depend upon the temperature of the fluid whose level is to be gaged, the vapor pressure of the sensing fluid, and the volumetric change in the fluid when changing from liquid to gas at that temperature and at various pressures. Selection of an appropriate sensing fluid and pressure is well within the skill of workers in the art.

Until the level of liquid reaches level Y, the heat added to coil 26 by conduction through capsule and by heater 28 will maintain the fluid in coil 26 in gaseous form. When the liquid covers coil 26 it will be cooled rapidly, as was coil 27, and its fluid contents will be liquefied further reducing the pressure of the still gaseous fluid in capsule 20. The capsule will collapse and lower actuator 46 to close contact 41. Resistor 51 will be short circuited and full power will be applied to heater 28.

Thus full power is applied to heaters 28 and 29 when the coils 26 and 27 associated with them are immersed in liquid. This is done to decrease the response time of the apparatus as liquid level falls below levels Y and Z. Cooling and liquefication of the sensing fluid in coils 26 and 27 is rapid upon immersion of these coils in liquid but, without added heat, warming of these coils to vaporize the sensing liquid would not occur until relatively long after the liquid has been lowered beyond them. Inclusion of the heaters operates to warm and gasify the sensing fluid in tube 18 as liquid level falls below the coils, greatly reducing responsive time and making it relatively short.

The degree of expansion of capsule 20 signals the presence or absence of liquid at levels Y and Z and movement of the capsule wall in response to level change has been employed to blow warning whistles and to actuate valves. Advantageously, electrical signals indicative of level are provided and this may be accomplished, as shown, by the addition to actuator 46 of switch 44, in a circuit X—X, which opens and closes with switch 41, and switch 45, in a circuit W—W, which opens and closes with switch 40.

It will be apparent to artisans that the invention can be employed to gage levels of liquids other than cold ones, it being necessary only that the material and pressure in the sensing tube liquefy in greater degree as the liquid to be gaged reaches successively higher levels to be gaged. The amount of heat added to the heaters can be decreased as the liquid temperature is lowered. In the case of very cold liquids such as liquid oxygen, nitrogen, and air, the heat input to the sensing tube by conduction through the capsule is sufficient whereby it is not necessary or desirable to energize the heaters until the associated coils of the sensing tube are immersed in liquid.

I claim:

1. A gage for determining the presence of liquid at a selected level comprising a sealed container filled with fluid, means for adding heat to said fluid in said container, said fluid being pressurized to liquefy when said heat is conducted away at a rate corresponding to the rate of conduction from the container to the liquid when the container is immersed in liquid and to gassify when said heat is conducted away at a rate corresponding to the rate of conduction from the container to the vapors of said liquid when said container is immersed in said vapors, said container comprising a pressure expansible capsule and a tube having a portion disposed at the level to be gaged.

2. The invention defined in claim 1 in which said means for adding heat is effective to add heat at a more rapid rate upon immersion of said container in liquid than upon immersion of said container in said vapors.

3. A level gage for determining the presence of liquid at a selected level comprising, a pressure responsive expansible capsule and a tube joined together to form a sealed container filled with fluid, said tube having a portion disposable at a level to be gaged, an electric heater in heat conducting relation to said portion for adding heat thereto, said fluid being pressurized to liquefy when said heat is conducted away at a rate greater than the rate of addition and to vaporize when said heat is conducted away at a lesser rate, and means responsive to the degree of expansion of said capsule for maintaining said heater energized when the fluid in said portion is liquid.

4. The invention defined in claim 3 in which said means for maintaining the heater energized is effective to maintain the heater energized in lesser degree when said fluid is gaseous than when said fluid is liquid.

References Cited in the file of this patent

FOREIGN PATENTS 130,943     Sweden _____ Feb. 27, 1951